(12) United States Patent
Prinzing

(10) Patent No.: US 6,496,202 B1
(45) Date of Patent: *Dec. 17, 2002

(54) METHOD AND APPARATUS FOR GENERATING A GRAPHICAL USER INTERFACE

(75) Inventor: Timothy Prinzing, Capitola, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,614

(22) Filed: Jun. 30, 1997

(51) Int. Cl.$^7$ ................................................. G09G 5/00
(52) U.S. Cl. ........................................ 345/762; 345/763
(58) Field of Search ................................. 345/333, 334, 345/762, 763

(56) References Cited

U.S. PATENT DOCUMENTS

| | | | | |
|---|---|---|---|---|
| 5,583,983 A | * | 12/1996 | Schmitter | .................... 395/705 |
| 5,715,432 A | * | 2/1998 | Xu et al. | ..................... 395/500 |
| 5,842,020 A | * | 11/1998 | Faustini | ...................... 345/333 |
| 5,848,246 A | * | 12/1998 | Gist | ...................... 395/200.58 |
| 5,892,949 A | * | 4/1999 | Noble | ........................... 717/4 |
| 5,956,736 A | * | 9/1999 | Hanson et al. | .............. 707/513 |

* cited by examiner

Primary Examiner—Ba Huynh
(74) Attorney, Agent, or Firm—Martine & Penilla, LLP

(57) ABSTRACT

Embodiments of the invention are used to customize a graphical user interface (GUI) that represents the view in a Model/View/Controller architecture. The model contains an application's data and one or more structural components that are used to identify the GUI components of the view. A factory builds the GUI using characteristics of the structural components to identify a set of GUI components to create the view.

17 Claims, 10 Drawing Sheets

METHOD AND APPARATUS FOR GENERATING A GRAPHICAL USER INTERFACE

BACKGROUND OF THE INVENTION

1. Field of the Invention

This invention relates graphical user interfaces, and, more specifically to the generation of components of a graphical user interface.

2. Background Art

A software application typically includes a graphical user interface (GUI) for displaying the application's output and receiving user input that consists of GUI components. Examples of GUI component types include menu, scroll bar, text field, button, check box, list, and label. There are a number of software vendors that have developed GUI libraries that consist of software modules that implement GUI components. Mechanisms are provided to access a GUI library to incorporate the desired GUI component from the library for use with the software application to generate a piece of the application's GUI. The mechanisms currently available for accessing a vendor's GUI library limit the application developer to one GUI library. That is, it is impossible to intermingle one vendor's GUI components with another vendor's GUI components. Further, it is impossible to customize an application's GUI by replacing one component of the GUI with another GUI component.

One technique, or mechanism, that has been used in the object-oriented environment for accessing a vendor's GUI library is referred to as the factory technique. A factory creates or produces objects at runtime. The factory technique is described below with reference to an abstract factory implementation and a factory method implementation. Neither the abstract factory nor the factory method implementations allow a software application to intermingle GUI components from different vendor's GUI libraries.

Abstract Factory

An abstract factory is implemented in an object-oriented environment using factory and product abstract classes that define the operations or methods to be implemented by their concrete subclasses. The factory includes methods that are used to create an instance of a product concrete subclass. A product concrete subclass is a specific GUI component and includes the GUI component's operations.

An abstract factory can be used, for example, to allow an application developer to write a software application that contains references to the GUI components of a generic GUI library. At run time, the GUI library is specified and the GUI component references are resolved to refer to GUI components in the specified GUI library. Using this technique, a software application can be written to use one GUI library's GUI components (e.g., Motif GUI components) in one runtime environment and another GUI library's GUI components (e.g., Presentation Manager GUI components) in another runtime environment.

To instantiate Motif's scroll bar without using the abstract factory technique, the following C++ code can be used:

(1) ScrollBar* sb=new MotifScrollBar;

The above code statement is not advantageous because it hard-codes the Motif standard into the application. Instead, the following code can be used to create a scroll bar GUI component:

(2) ScrollBar* sb=guiFactory->CreateScrollBar( );

In this case, guiFactory can be an instance of either the MotifFactory or the PMFactory concrete class both of which are subclasses of a GUIFactory abstract class. FIG. 1 provides an example of the abstract product classes and concrete subclasses used in the abstract factory design pattern. There are three abstract classes, GUIFactory 102, Menu 112 and ScrollBar 122. Since they are abstract classes, they are not instantiated at runtime.

GUIFactory 102 is an abstract class that specifies methods for creating GUI components (e.g. scroll bar, window, and button) such as the CreateMenu and CreateScrollBar methods. GUIFactory 102 is referred to as a factory because it specifies methods for producing objects. Subclasses of GUIFactory 102 define a specific implementation of the methods defined by GUIFactory 102. Two subclasses of GUIFactory 102 which are concrete factories (i.e., create concrete product objects) are MotifFactory 104 and PMFactory 106. MotifFactory 104 provides a Motif-specific implementation of the same method in GUIFactory 102. PMFactory 106 defines a Presentation Manager-specific implementation of the method.

One of the concrete factories is instantiated at runtime based on the look-and-feel standard that is specified (e.g., as a runtime parameter). If, for example, the look-and-feel standard is determined at runtime to be Motif, an instance of MotifFactory is instantiated. The second code statement provided above would have the effect of invoking the CreateScrollBar method or operation of the MotifFactory object which would create a scroll bar having the Motif look-and-feel.

The other two abstract classes, Menu 112 and ScrollBar 122 define the methods that are implemented by a concrete subclass. For example, MotifMenu 114 and PMMenu 116 define specific implementations of the Popup operation defined by Menu 112 based on their respective look-and-feel standards. Similarly, the ScrollTo operation defined in the Scroll Bar 122 abstract class is implemented by MotifScrollBar 124 and PMScrollBar 126. In the above example, the second code statement would invoke the CreateScrollBar method of MotifFactory 104 that would result in the creation of an instance of MotifScrollBar 124.

The abstract factory uses factory and product abstract classes to define the methods that are implemented by their respective concrete classes. An application does not directly instantiate classes. Instead, objects can be instantiated indirectly as illustrated by the second code statement. The application effectively uses a pointer to the object to be instantiated that is resolved at runtime.

The abstract factory mechanism thereby eliminates the situation where the application is forced to use one look-and-feel standard or another. However, the application must select one look-and-feel standard and use only that standard's GUI components. It is not possible, for example, to have both a scroll bar that has the Motif look-and-feel (i.e., MotifScrollBar 124) and PM scroll bar (i.e., PMScrollBar 126) GUI component in the same application using the abstract factory mechanism. Further, all of the classes are defined for the application prior to runtime. Thus, it is not possible to modify the class architecture by inserting, for example, new subclasses of Menu 112 or ScrollBar 122 at runtime.

Factory Method

In the abstract factory approach, a factory object is instantiated that knows the type of product objects that can be constructed. The product object's constructor is used to construct the product object. Another factory mechanism that has the same drawbacks as the abstract factory is referred to as a Factory Method. The Factory method is implemented by specifying in the abstract object a call to a method that creates the product instead of calling a constructor. The function that creates the product object is referred to as a factory method because it "manufactures" (or creates) the product object. The factory method is used instead of a constructor to create a product object. FIG. 2 provides an example of a factory method class architecture.

The architecture in FIG. 2 illustrates a framework that produces GUI components from a vendor's GUI library of GUI components. There are two abstract classes, an abstract creator class (i.e., GUI 202) and an abstract product class (GUIComponent 212). GUI 202 includes a factory method declaration (i.e., createUI). However, GUI 202 does not know what type of product it should create (i.e., GUI 202 cannot call a constructor method for MotifComponent 214 or PMComponent 216).

The factory method of GUI 202 is redefined in two concrete creator object subclasses of application 202 (i.e., MotifUI 204 and PMUI 206). MotifUI 204 defines a createUIComponent factory method to create an instance of MotifComponent 214. Similarly, PMUI 206 defines a createUIComponent factory method to create an instance of PMComponent 216.

Like the abstract factory, the factory method mechanism requires that the creator and product classes be defined and known prior to runtime. That is, the class architecture is known and defined prior to runtime. It is not possible, for example, to modify the class architecture by inserting a new subclass of the abstract creator or product classes (i.e., GUI 202 and GUIComponent 212).

In both the factory method and abstract factory approaches, a factory produces a GUI from a single vendor's GUI library. Therefore, a GUI produced by a traditional factory has a single look-and-feel. Therefore, an application that uses the traditional factory approach to generate its GUI is limited to a GUI that has a single look-and-feel. For example, a GUI that is produced by concrete factory 104 has a Motif look-and-feel while concrete factory 106 produces a Presentation Manager look-and-feel. Similarly, in the factory method approach, a concrete creator (e.g., MotifUI 204 or PMUI 206) that is used to create a GUI creates a GUI components from a single look and feel. For example, the createUIComponent method of MotifUI 204 creates a MotifComponent 214. FIG. 3 illustrates the traditional factory approach.

Application environment 306 contains GUI 332 that was created by traditional factory 302. Factory 302 contains a look-and-feel that is generated by view components $V_{a1}$-$V_{an}$ of GUI library 312. Therefor, GUI 332 offers a single look-and-feel. Similarly, application environment 304 contains GUI 324 created by factory 302. GUI 324 has a single look-and-feel that is generated by view components $V_{b1}$-$V_{bn}$ of GUI library 312. It is not possible for GUI 332 or GUI 324 to contain a scroll bar GUI component having a Motif look-and-feel and a scroll bar GUI component having a PM look-and-feel in the same application using the factory method mechanism.

Further, GUIs 332 and 324 are static implementations that are woven into an application's program code. Unless the application's program code is modified, GUIs 332 and 324 provide the same look-and-feel each time the application program is invoked. One example of such an application is the Explorer in Microsoft's Windows 95 product. A tree control is provided in the Explorer that allows the user to browse files, etc. Each node of the tree is comprised of an icon and a label. The icon and the text of the label can be changed. However, it would be necessary to modify the program code to change the look-and-feel for a node of the tree. For example, without modifying the program code, it is not possible to provide a GUI in which a node can either use the standard look-and-feel (i.e., an icon and a label) or adopt a new look-and-feel (e.g., button that lauches an application, a GUI component that provides a preview of the item to which the tree node is associated by displaying text, or playing a video clip, or displaying a picture).

Model View Control Paradigm

In the Smalltalk-80 programming language, a mechanism is used to implement graphical user interfaces (GUIs) that is referred to as Model/View/Controller or MVC. In MVC, the functions performed in conjunction with a GUI are split into separate programming modules, or objects. FIG. 4 provides an illustration of the objects in the MVC paradigm.

Model 404 is the application object. Model 404 is, for example, a clock application that keeps track of a time by updating an internal record of time every second. View 406 implements the screen representation portion of the GUI. For example, view 406 can be comprised of a digital clock GUI component that displays a digital readout of the time maintained by model 404. Controller 402 provides the mechanism for responding to input received via the GUI. View 406 uses Controller 402 to implement its response strategy.

Controller 402 receives and interprets input such as a mouse click or keyboard input. For example, if controller 402 interprets keyboard input as a value to be used to reset the clock, it calls a method (e.g., setTime) of Model 404 to change the internal record of time stored by Model 404. Controller 402 might send a change message directly to view 406 even though the model hasn't changed. For example, controller 402 may interpret user input as a request to reorder a list displayed by view 406. In this case, controller 402 sends the reformat message to view 406 to resort the list.

When a change is made to the model such as in the case of the setTime operation, the change must be sent to view 406. A subscribe/notify protocol is implemented between model 404 and view 406. View 406 invokes the attach method of model 404 to register as being "interested" in the data maintained by model 404. Whenever the data in model 404 changes, model 404 notifies view 406. View 406 invokes the retrieveTime method of model 404 to retrieve the changed data and then displays the modifications. View 406 can send a detach message to model 404 to discontinue notifications from model 404.

In the SmallTalk paradigm, view 406 comprises an integral set of GUI components that includes a specific clock display GUI component (e.g., digital display GUI component). It is not possible to modify the integral set of GUI components to replace the clock display GUI component without modifying the program code that implements view 406. Thus, it is not possible to plug in an analog clock display GUI component to replace the digital display without modifying the program code that implements view 406.

SUMMARY OF THE INVENTION

Embodiments of the invention are used to customize a graphical user interface (GUI) that represents the view in a Model/View/Controller architecture. The model contains an application's data and one or more structural components that are used to identify the GUI components of the view. A factory builds the GUI using characteristics of the structural components to identify a set of GUI components to create the view.

The factory can build a view using GUI components from multiple look-and-feel standards (e.g., Motif, Presentation Manager, Microsoft Windows, or Macintosh). A GUI component can be added to the set of GUI components known to the factory. The factory is instructed to use a GUI component for a given characteristic of a structural component.

In an embodiment of the invention, object-oriented programming is used. The model, view, controller and factory are implemented as software modules known as objects that include methods for performing logical functionality. The model has a document object that includes methods for modifying the application data contained in the model and notifying the view when a modification has occurred. The structural components of the model are implemented as an Element object class that represents a subset of a structural tree defined by the model's structural components. An element includes methods for traversing the tree and retrieving information about the tree. An attributes object class stores the characteristics associated with a structural element, or the model as a whole.

The view is comprised of a plurality of instances of a view fragment object class that implement GUI components. The factory includes methods for creating a view fragment instance using the attributes of an element of the model. A create method of the factory is invoked for a given element. The factory can query the element to retrieve its attributes. The factory uses the element's attributes to identify the GUI component object class to instantiate as a view fragment of the view.

The create method of the factory can be invoked by the view. For example, the create method can be invoked by a view fragment of the view to create other view fragments for the view. A view fragment may delegate to a child view fragment. The view fragment can invoke the factory to create the child view fragment. Thus, the view builds a structure comprised of view fragments. Since the view structure is created by the view, its structure can be different than the model structure. Further, the model is unaware of the structure of the view.

A view fragment includes methods for managing its portion of the GUI. In addition, a view fragment can be queried to determine the structural element to which it is mapped and the document associated with the view in which the view fragment is created. A change in the model can cause a change in the GUI. Additional view fragments can be added to the view as a result of a change in the model, for example. The view fragment includes methods for receiving a notification of a change in the model.

Model change notification is performed in embodiments of the invention using a listener object and a documentEvent object. The documentEvent includes information about the change (e.g., the name of the document that changed, the area of the document that changed and the edit history). The notification message that is sent to a view fragment contains the documentEvent.

The listener includes methods for forwarding a change notification that it receives from the model the view fragments contained in the view. To receive a notification from the model, the listener registers with the model. To discontinue receiving notifications, the listener can request the model to remove it from the models set of listeners.

The listener forwards a change notification to a parent view fragment. The parent view fragment determines whether any of its child view fragments are affected by the change. If so, the parent forwards the change notification to the child view fragment. The child view fragment is passed to the factory to use if the child view fragment needs to create a new view fragment.

DETAILED DESCRIPTION OF THE INVENTION

A method and apparatus for generating a graphical user interface is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
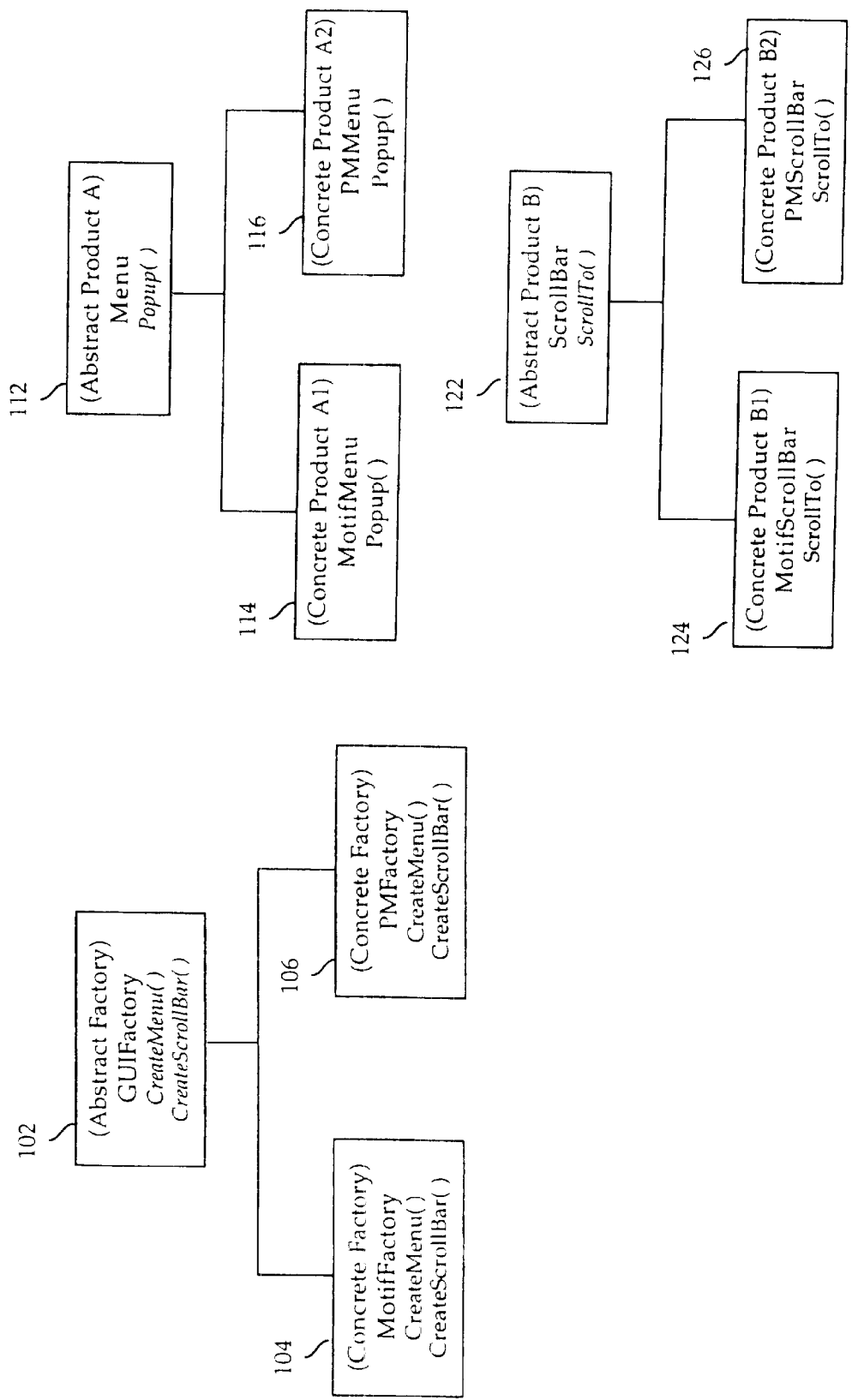
FIG. 1 provides an example of the abstract product classes and concrete subclasses used in the abstract factory design pattern.
Figure 2:
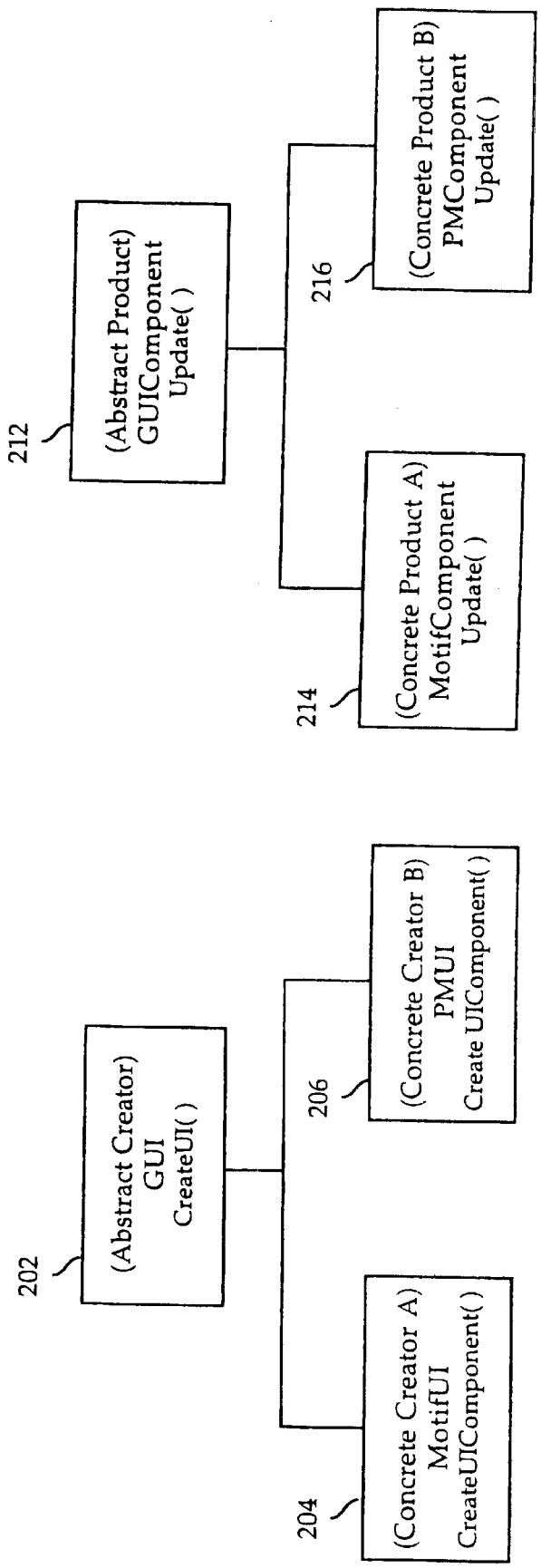
FIG. 2 provides an example of a factory method class architecture.
Figure 3:
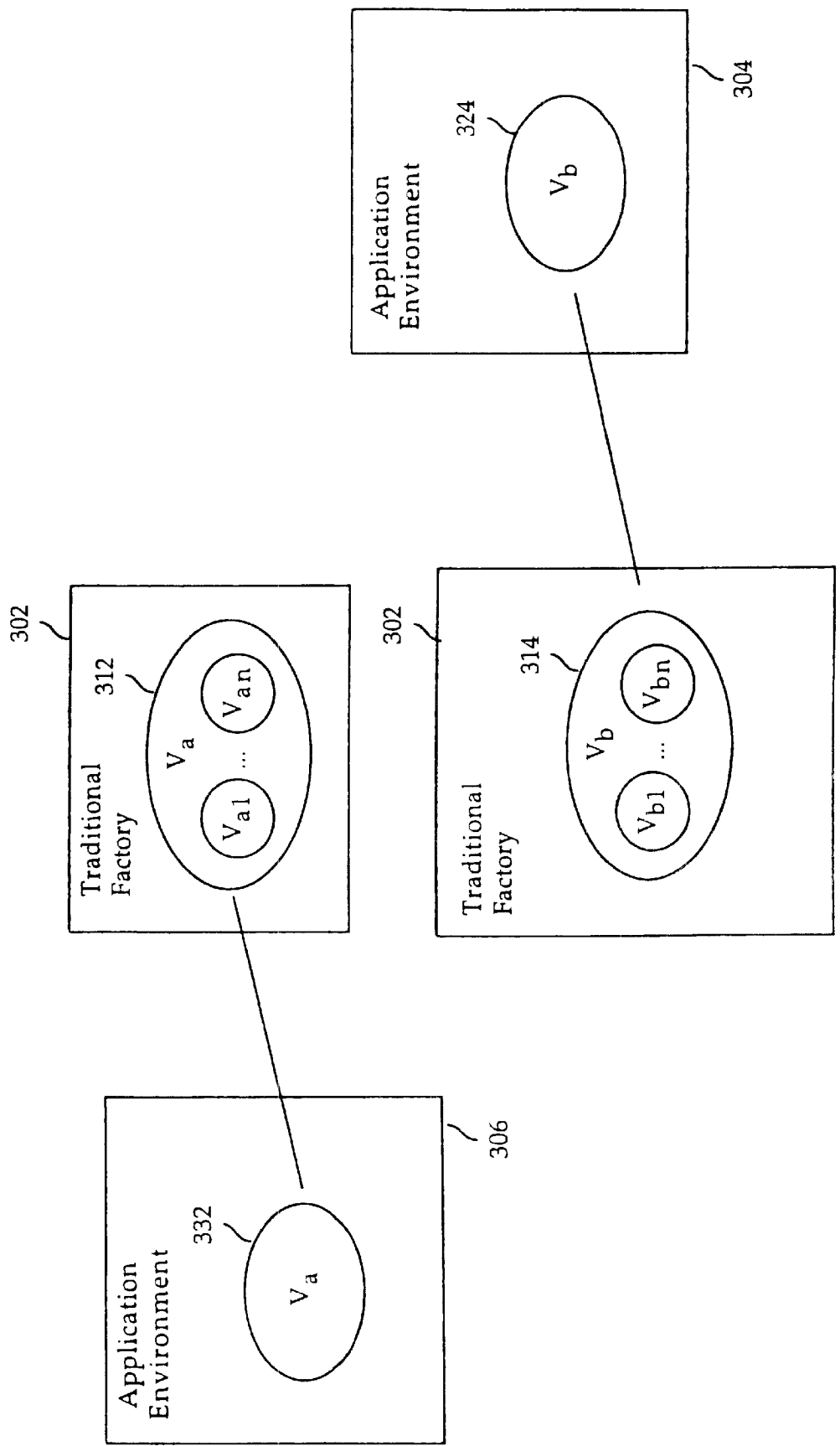
FIG. 3 illustrates the traditional factory approach.
Figure 4:
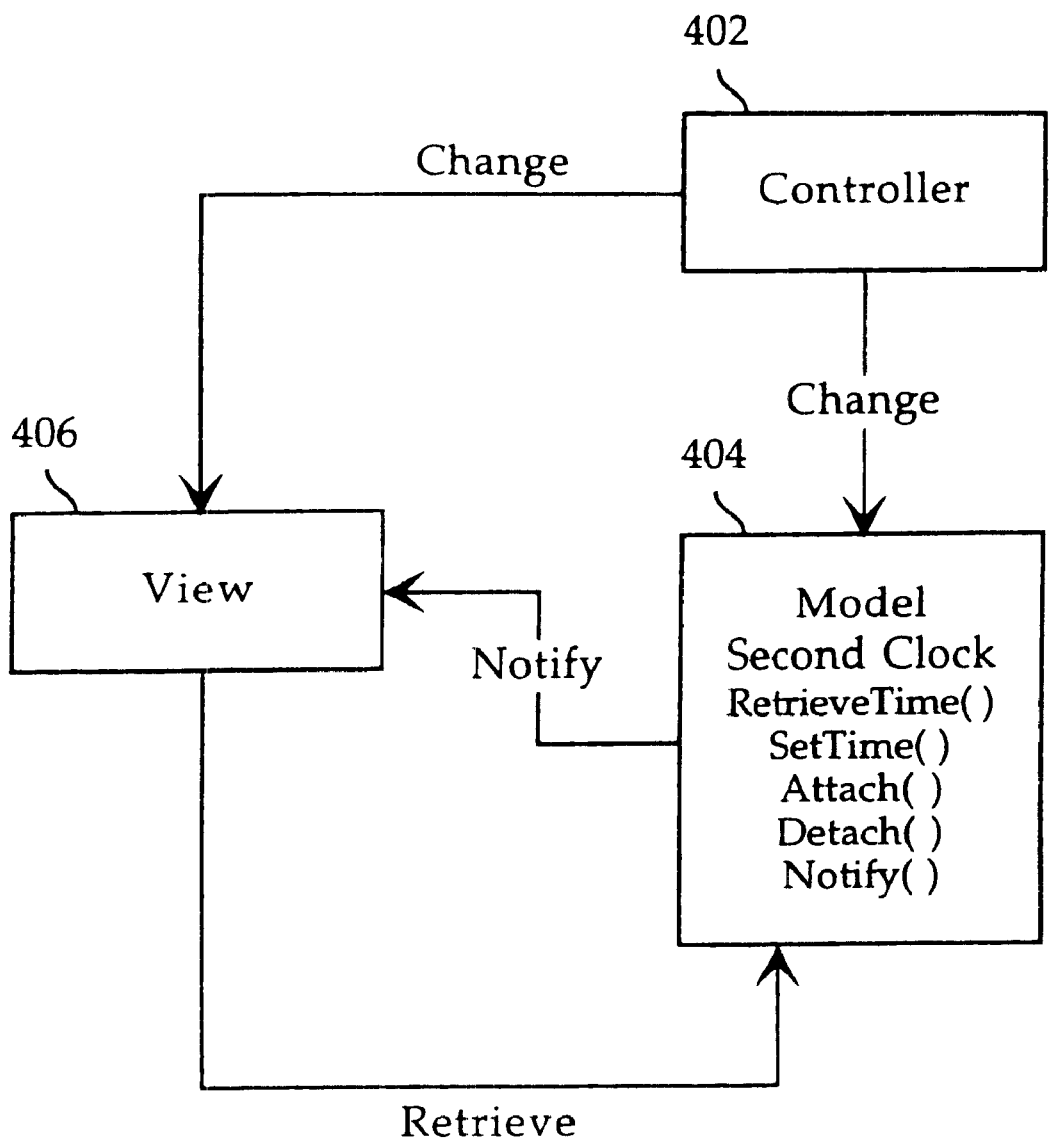
FIG. 4 provides an illustration of the objects in the MVC paradigm.
Figure 5A:
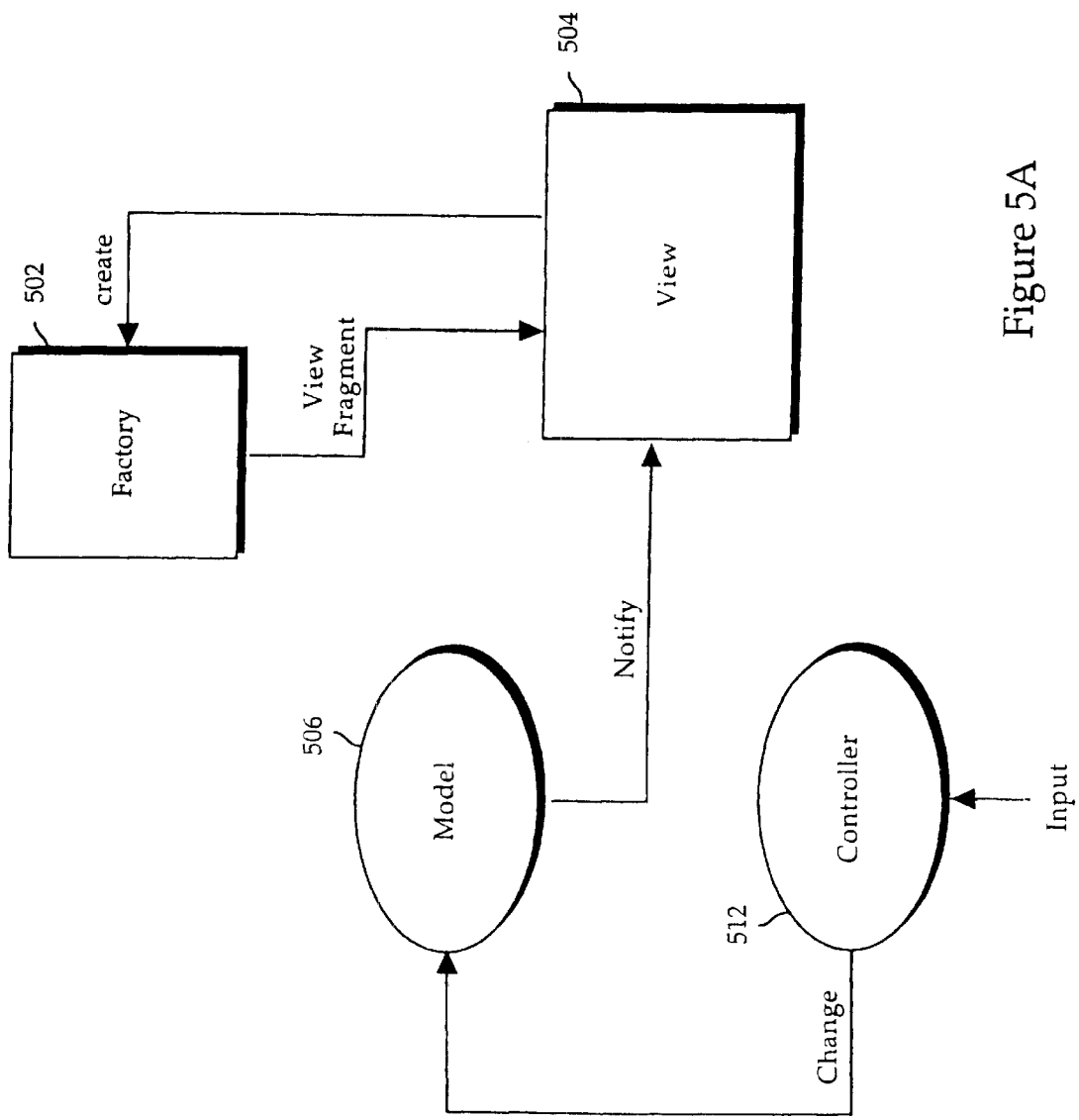
FIG. 5A illustrates components used in one or more embodiments of the invention.

In one or more embodiments of the invention, an MVC is combined with a factory to generate a graphical user interface (GUI) comprised of one or more view fragments. FIG. 5A illustrates components used in one or more embodiments of the invention.

In the MVC architecture, a controller alters the model based on input that it receives such as user input (e.g., keyboard and mouse input). Controller 512 performs the role of the traditional controller in the MVC architecture. Controller 512 receives input and sends change requests to Model 506 which contains application data. To modify the display to include changes to the model, View 504 receives notification that a change has occurred in Model 506. View 504 determines whether it needs to make any modifications to reflect the changes made to Model 506. View 504 may, for example, modify an existing view component or add a new view component as a result of the change notification.

View 504 can be an application's GUI and is comprised of view fragments that implement the components 6f the GUI. View 504 is not defined using a static implementation as used in the prior art. Embodiments of the invention provide the flexibility to compose varying implementations and structures for View 504. For example, View 504 can be comprised of view fragments from multiple GUI libraries. Further, it is possible using embodiments of the invention to customize View 504 by replacing one view fragment with another view fragment.

The same model (e.g., Model 506) can be used to create different structures for View 504. Thus, for example, it is possible to create a first structure of View 504 to break an HTML document into a series of multiple pages that are accessed using page icons, or use a one page view with a scroll bar. Both views can be created using Model 506. However, the structure of View 504 is generated by its view fragments. Model 506 can be unaware of the actual structure of View 504.

Information contained in Model 506 is used to determine the view fragments that are used for View 504. In addition to containing an application's data, Model 506 defines a structure that includes one or more structural components that are used to generate the application's GUI. The structural components of Model 506 have characteristics that are used to drive Factory 502 to create a plurality of view fragments for View 504. In addition, a view fragment of View 504 can request Factory 502 to create another view fragment.

Figure 5B:
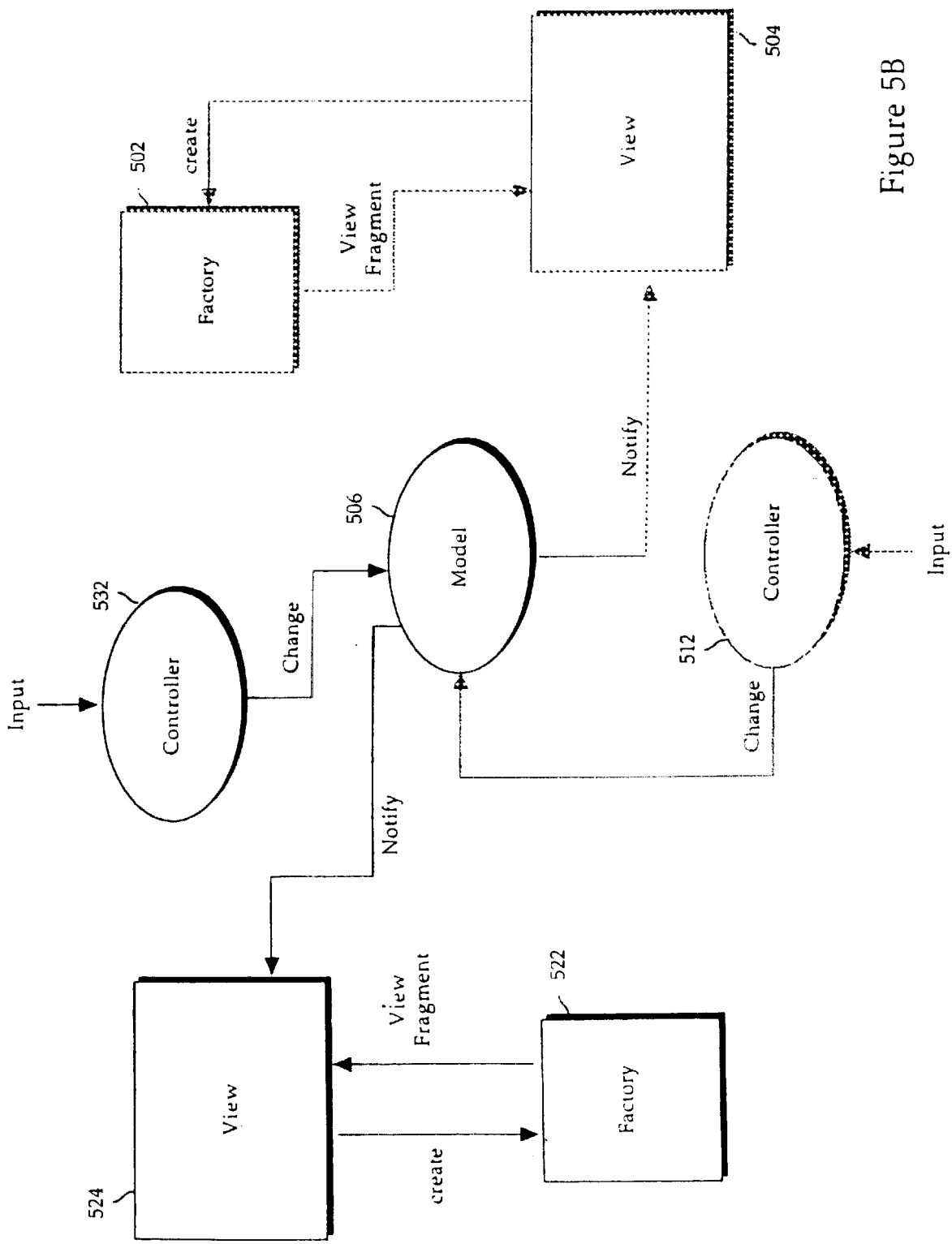
FIG. 5B illustrates the use of a single model to drive multiple views according to an embodiment of the invention.

Model 506 can be used to drive multiple views. FIG. 5B illustrates the use of a single model to drive multiple views according to an embodiment of the invention. As illustrated in FIG. 5A, Model 506 is used to drive Factory 502 to create view fragments for View 504. Referring to FIG. 5B, Model 506 is used to drive Factory 522 to create view fragments for View 524.

The same structural component can be used by Factory 502 to identify one view fragment and used by Factory 522 to identify a different view fragment. If Factory 522 uses a first set of view fragments that is different from a second set of view fragments used by Factory 502, View 524 and View 504 will be different. It is possible, however, for Views 504 and 524 to contain instances of the same view fragment. Thus, it is possible to create a new look-and-feel for an application's GUI by using a different factory.

The same factory can be used to build different view fragments for the application's GUI. Changes in Model 506 can cause different view fragments to be created for View 504. For example, inserting, deleting or replacing a structural component or changing a characteristic of a structural component can cause a different view fragment to be created for View 504. Further, Factory 502 can be instructed to create a different view fragment for a characteristic of a structural component of Model 506 without modifying Model 506.

Figure 6:
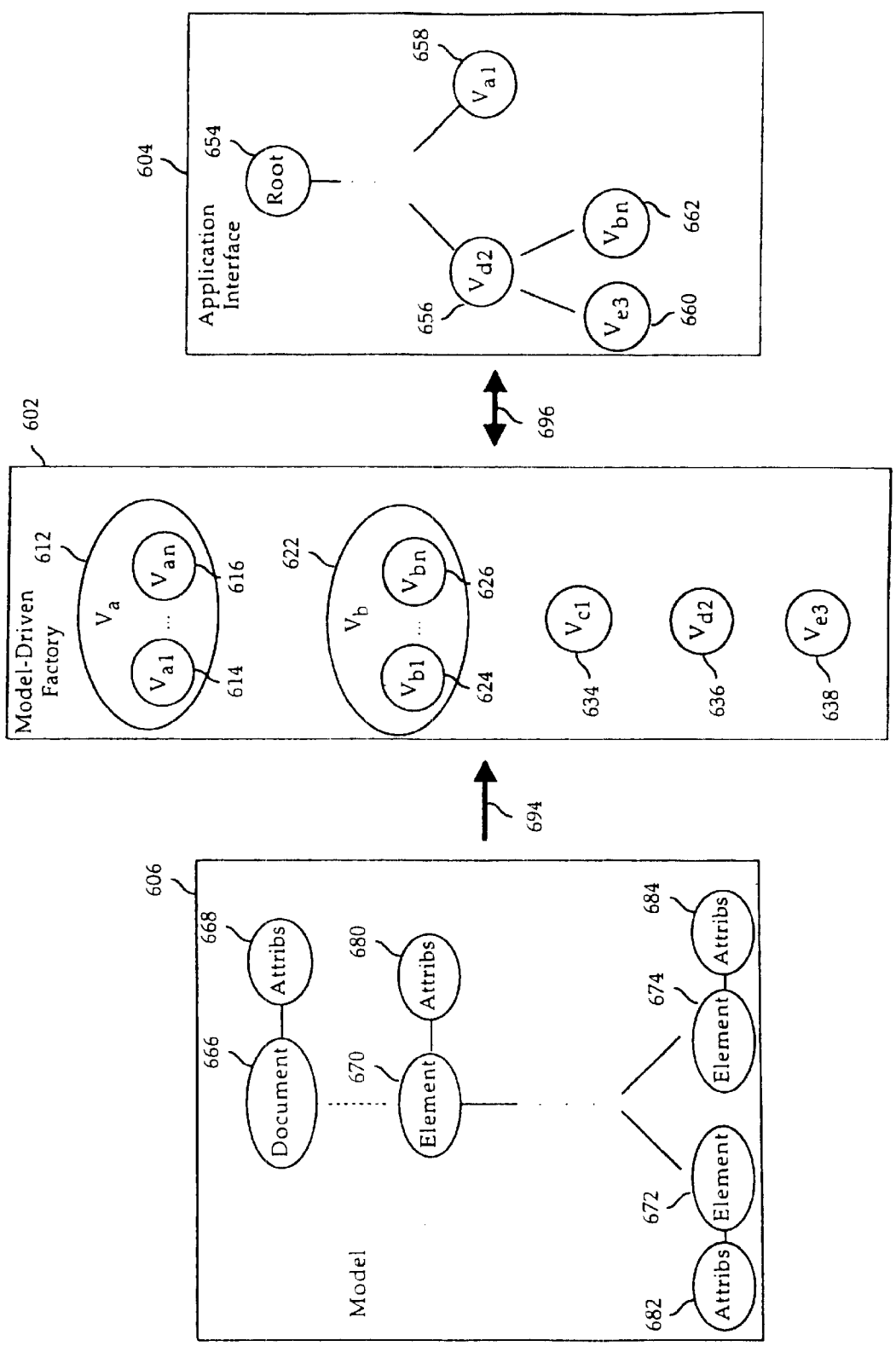
FIG. 6 provides illustrates the model, factory and view components used in embodiments of the invention.

The structural component of Model 506 is referred to as an element whose characteristics are defined as its attributes. Elements of Model 506 are arranged in a hierarchical, or tree, structure. View fragments of View 504 (or view 524) can also be arranged in a tree structure. Factory 502 is made aware of the view fragments that can be used to create View 504. FIG. 6 illustrates the model, factory and view components used in embodiments of the invention.

Model 606 contains the data associated with a software application. View 604 constitutes the portion of the GUI that is visible to a user. View 604 includes a plurality of view fragments (e.g., view fragment 654–662) created by Factory 602. Information contained in Model 606 is used to identify some or all of the view fragments that comprise View 604. Factory 602 is asked to create a view fragment from a set of view components known to Factory 602. Factory 602 can receive a request to create a view fragment based on the contents of Model 606. A view fragment that is created by Factory 602 may wish to delegate (e.g., some functionality or some of its responsibilities) to one or more child view fragments. In that case, the view fragment requests that Factory 602 create the child view fragment(s).

In one or more embodiments of the invention, in addition to application data, Model 606 further includes a structure, or logical organization, that is used to identify a view fragment that is created by Factory 602. In one or more embodiments of the invention, Model 606, Factory 602, and View 604 are implemented using an object-oriented programming language such as the Java programming language from Sun Microsystems, Inc. The following provides a brief discussion of object-oriented programming concepts.

Object-Oriented Programming Concepts

Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software program can be written using an object-oriented programming language whereby the program's functionality is implemented using objects.

Model

Referring to FIG. 6, Model 606 contains information to identify a structure that is used to drive Factory 602 to produce View 604. Model 606 is defined in an embodiment of the invention by the contents of a document that specifies the structure of Model 606. In one or more embodiments of the invention, the document specifies a structure comprised of elements and element attributes.

A structure of this type can be expressed using a language such as Standard Generalized Markup Language (SGML). SGML is a meta-language from which other languages can be created. SGML uses "tags" associated with information contained in a document to identify an element and, possibly, attributes associated with the element.

The Hypertext Markup Language (HTML) used to define Web pages is an example of a language created from SGML. The following is an example of an HTML document that contains tags for defining structure:

<HTML>
. . .
<INPUT TYPE=text NAME=inputfield1 VALUE="">
. . .

The boldfaced words inside the brackets (i.e., "< >") are tags in the HTML language. The tags are used to indicate the meaning of each part of the HTML document. The HTML tag identifies the document as an HTML document. The INPUT tag indicates that the portion of text inside the brackets defines an input element. Three attributes are defined for the input element(i.e., TYPE, NAME, and VALUE) with associated values that specify properties of the input element. For example, the TYPE attribute identifies the input element as a text entry field.

HTML uses tagging as suggested by SGML to identify the structure with an HTML document. It should be apparent that other techniques can be used in an embodiment of the invention to define structure. Further, it should be apparent that components other than elements can be used to specify structure.

HTML is one example of a document type that can be used with embodiments of the invention. It should be apparent that a document that contains another type of structural definition can be used with one or more embodiments of the invention. Examples of other document types include documents that contain source code for a programming module and rich-text formatted (RTF) documents. Examples of structure that are contained in an object class source code document include: class definition, method, variable, and comment. RTF is used for transferring formatted text documents between applications. Like HTML, an RTF document contains keywords that identify the structure of the document.

In one or more embodiments of the invention, Model 606 is implemented as an object class, Document 6,66, that implements a set of methods. A set of attributes that contain information regarding Model 606 can be associated with Document 666. Attributes 668 encapsulates methods associated with the attributes of Document 666. Methods of Document 666 are used to edit the contents of the document that defines the model (e.g., an HTML document).

Document 666 further includes methods for supporting the notification function of MVC. Document 666 includes methods that track changes made to the contents of the document that facilitate the notification function. Methods of Document 666 can be used to retrieve attributes associated with the document (e.g., document title and document author).

Methods of Document 666 include the following:

checkinStickyPosition(Position)
    Returns a sticky position that was previously checked out.

checkoutStickyPosition(Position)
    Gives a position that will track change as the document is altered.

getAttributes( )
    Return the properties associated with the document.

getDefaultRootElement( )
    Returns the root element that views are based on unless some other mechanism for assigning views to element structures is provided.

getEndPosition( )
    Returns a position that represents the end of the document.

getLength( )
    Returns the number of characters of content that is currently contained in the document.

getLineCount( )
    Return the number of lines contained in the document.

getRootElement(String)
    Returns a root element of a document structure with the given name.

getStartPosition( )
    Returns a position that represents the start of the document.

getText(Range)
    Fetch the text contained within the given portion of the document.

insertString(int, String, Attributes)
    Insert a string of content.

insertString(Position, String, Attributes)
    Insert a string of content.

lineToRange(int)
    Convert the given line index to a range within the document.

positionToLine(Position)
    Convert a position to a line/paragraph number within the document where the line numbers are indexed from 0.

remove(int, int)
    Remove a portion of the content of the document.

remove(Range)
    Remove a portion of the content of the document.

removeDocumentListener(DocumentListener)
    Unregister the given observer from the notification list so they will no longer receive change updates.

setAttributes(Range, Attributes, boolean)
    Change the content element attributes used for the given range of existing content in the document.

untrackedPosition(Position, int)
    Gives a temporary position that does not track change.

These methods are examples of methods that can be implemented for Document 666. Other methods can be used to replace or supplement these methods.

In the Java programming language, an interface is used to define the Application Programming Interface (API) to be implemented by an object class. In embodiments of the invention, Document is an interface that is implemented by each of the various types of documents. Thus, for example, an HTML Document object class can implement Document.

Element

In one or more embodiments of the invention, an element (e.g., Elements 670, 672 and 674 of FIG. 6) is used as the structural component of Model 606. For example, elements of Model 606 for an HTML document can include an HTML element and an INPUT element. Thus, the contents of a document are used to identify an Element of Model 606. An Element of Model 606 can be queried (e.g., by invoking the getRange method of the Element) to identify the portion of the document that it represents.

In one or more embodiments of the invention, the elements of Model 606 form a hierarchy, or tree structure (e.g., see FIG. 6). The model hierarchy comprises a root element (e.g., Element 670) and a plurality of descendants of the root element (e.g., Elements 672 and 674) that can be located on multiple levels and along multiple branches of the tree. If an element contains children, the getRange method identifies the portion of the document that both the parent and its children represent.

Referring to FIG. 6, Elements 672 and 674 are determined by the contents of Model 606. Element 672 can be an InputElement for an INPUT statement in an HTML document. Element 670 can be determined using a default root element instance, or by specifying a root element instance. The getRootElement method of Document 666 can be invoked and given the name of a root element to create the specified root element for a model hierarchy. The getDefaultRootElement method of Document 666 can be used to return a default root element. For example, the getDefaultRootElement can return an instance of an HTML element object class that is the default root element for the tree structure created for an HTML document.

In one or more embodiments of the invention an Element is implemented as an object that encapsulates instance variables and methods. Methods of Element include the following:

getAttributes( )
  Fetch the collection of attributes this element contains.
getChild(int)
  Fetch the element at the given index.
getDocument( )
  Fetch the document associated with this element.
getName( )
  Fetch the name of the element.
getParent( )
  Fetch the parent element.
getRange( )
  Get the portion of the document spanned by this element.
isLeaf( )
  Indicates whether or not the element is a leaf element.
numChildren( )
  Returns the number of child elements contained by this element.
positionToElementIndex(Position)
  Get the child element index closest to the given position.

These methods are examples of methods that can be implemented for Element. Other methods can be used to replace or supplement these methods.

Attributes

A property that defines aspects of an Element or a Document is referred to as an attribute (e.g., attributes 680, 682, and 684 of FIG. 6 are attributes of Elements 670, 672, and 674). For example, TYPE, NAME and VALUE are attributes of an input element. Attribute information is stored in instance variables of Attributes as name-value pairs. An Attributes class is defined in an embodiment of the invention to encapsulate the instance variables and methods for attributes of an element of Model 606. For example, an Attributes class can be associated with an INPUT Element class that includes TYPE, NAME and VALUE instance variables that are initialized with the values contained in the INPUT element statement of an HTML document.

Attributes is implemented as an object class that includes methods for operating on an attribute of an element. Methods of Attributes include the following:

addChangeListener(ChangeListener)
  Add a listener to track changes to an attribute.
copyAttributes(Attributes)
  Copies the locally defined attribute set to another Attributes instance.
getAttribute(String)
  Fetch the value of the given attribute. If the value is not found locally, the search is continued upward until the value is either found or there are no more parents. If the value is not found, null is returned.
getAttributeNames( )
  Fetch the names of the attributes that are defined locally.
getLocalAttribute(String)
  Fetch the value of the given attribute. If the value is not found locally, discontinue the search and return null.
getResolveParent( )
  Retrieve identity of parent Attributes instance to query for a value of a non-locally defined attribute.
removeAttribute(String)
  Remove the attribute from the set. The attribute will not be defined locally and will only be resolved if defined by a parent attribute set.
removeAttributes( )
  Removes all locally defined attributes.
removeChangeListener(ChangeListener)
  Remove a listener that was tracking attribute changes.
setAttribute(String, Object)
  Set the value for some general attribute.
setResolveParent(Attributes)
  Set parent Attributes instance to query for a value of a non-locally defined attribute.

These methods are examples of methods that can be implemented for Attributes. Other methods can be used to replace or supplement these methods.

View Factory

Factory 602 contains object classes that implement views. For example, Factory 602 can contain object classes 614–616 that comprise View 612 and object classes 624–626 that comprise View 622. Factory 602 can further contain object classes that comprise a portion of a view such as object classes 634–638.

Figure 7:
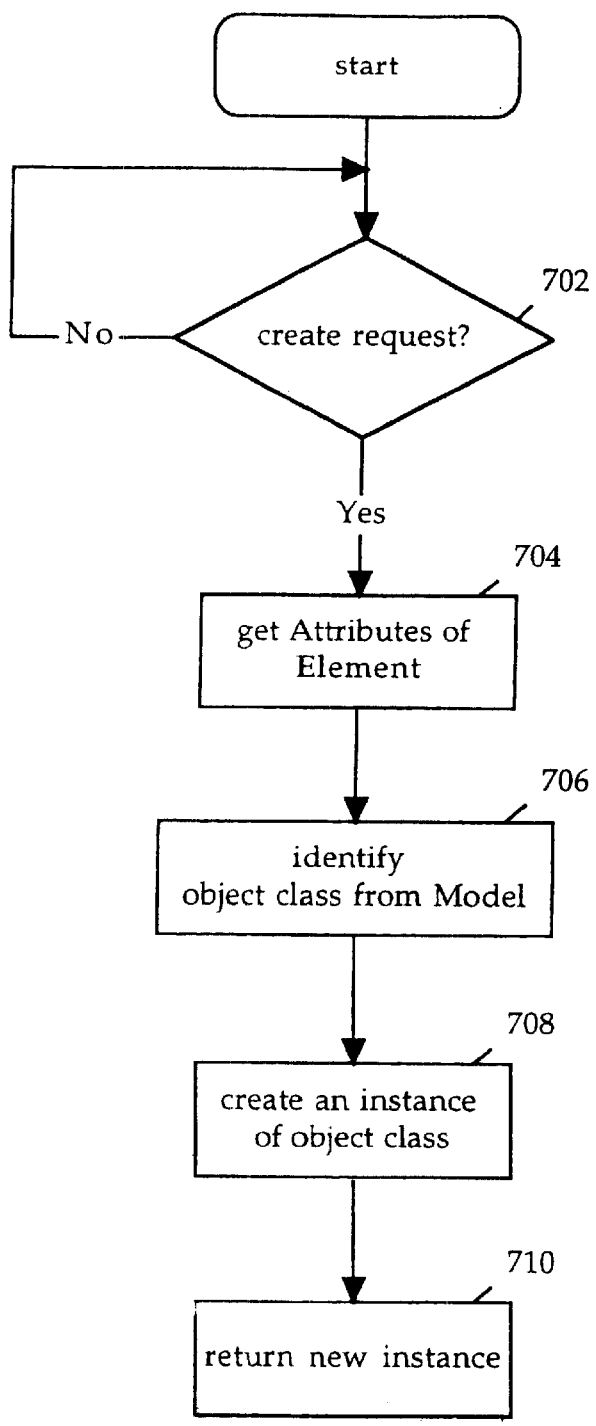
FIG. 7 provides an example of a create object instance process flow according to an embodiment of the invention.

Factory 602 creates View 604 by creating instances of object classes that are known to it. An object class can be added to or removed from the set of object classes known to Factory 602. FIG. 7 provides an example of a create object instance process flow according to an embodiment of the invention. In step 702, a create request is sent to Factory 602 along with the Element of Model 606 to which the new object instance is associated. At step 704, the Attributes object instance associated with the Element instance specified in the create request can be queried to obtain the attributes associated with Element. Factory 602 uses the attributes associated with the Element to determine what object class to instantiate at step 706. For example, Factory 602 can use the "value" associated with the NAME attribute to identify an object class (e.g., that has the same name as the "value"). Alternatively, a mapping can be provided to Factory 602 when a new class is added to its set of object classes that specifies the object class that is to be instantiated for a particular "value" of the NAME attribute. In both cases, the attributes of an Element specify characteristics of Model 606 that are used to identify a view object class instance (i.e., a view fragment) to be created by Factory 602.

At step 708, Factory 602 creates the instance of the object class in View 604. At step 710, Factory 602 returns a reference to the new object instance to the requesting Element in Model 606. Thus, the Element can identify the object class instance in View 604.

As is discussed below, an instance of an object class in View 604 can request that an object instance be created for View 604. The process flow of FIG. 7 can be used to satisfy the a request from View 604. At step 710, the new instance is returned to the object class instance in View 604 that requested the new instance.

In an embodiment of the invention, Factory 602 is implemented as an object that includes variables and methods. Methods of Factory 602 include the following:

create (Element)
    Create a view object given an Element of the Model.
create(Element, Range)
    Create a view object given an Element and range of the Model. The range is the portion of the Element to use to determine which object class to instantiate to create the view object.

A range specifies a start and end position in the Model. A position identifies the point between two characters in the Model. The range can be used to break an Element into multiple view fragments. For example, an Element may contain displayable text that is too large to fit in one view fragment's displayable area. The range can be used to split the text into multiple view fragments such that a portion of the text is displayed in each of the view fragments.

These methods are examples of methods that can be implemented for Factory. Other methods can be used to replace or supplement these methods.

View

Referring to FIG. 6, View 604 represents the view portion of MVC and is comprised of one or more view object class instances, or view fragments. A view fragment implements a portion of the GUI for a software application. For example, a view fragment can be a pop-up menu, a check box, or a button.

A view fragment can delegate to child view fragments. Thus, the view fragments that comprise View 604 can be expressed as a tree structure that includes a root (i.e., View Fragment 654) and a plurality of descendants arranged in a tree structure (e.g., View Fragments 656, 658, 660, and 662). The tree structure expresses the parent-child relationships between view fragment instances. A child view fragment instance implements an aspect of a view fragment delegated to it by its parent view fragment instance.

A view fragment (e.g., view fragments 654–662) is an instance of a View Fragment object class (e.g., 614, 616, 624, 626, 634, 636, and 644) that can be instantiated by Factory 602. As discussed above, a view fragment is instantiated from information contained in Model 606 or from a request from an existing view fragment.

For example, Attributes 682 contains the attribute information for Element 672. One attribute contained in Attributes 682 can be "name" which has an associated "value" that identifies an object class known to Factory 602 (e.g., object classes 614, 616, 624, 626, 634, 636, or 644). Factory 602 uses "value" to identify the object class to be instantiated for Element 672. For example, Factory 602 can use "value" to identify object class 636 and create an instance of object class 636 for View 604 (e.g., View Fragment 656).

A view fragment may delegate some of its responsibilities to one or more child objects. For example, View Fragment 656 may delegate to View Fragments 660 and 662. In this case, View Fragment 656 requests Factory 602 to create instances of the object classes associated with View Fragments 660 and 662 (e.g., object classes 624 and 626). Factory 602 creates instances of object classes 624 and 626 in response (i.e., View Fragments 660 and 662) which become children of View Fragment 656.

In one or more embodiments of the invention a View Fragment is implemented as an object that encapsulates instance variables and methods. Methods of View Fragment include the following:

breakView(axis, length, Shape)
    Break this view on the given axis at the given length. This causes a view to be created that represents the portion of the view that can fit within a given span. A factory is not needed for this operation since the view fragment created will be the same type as the view being broken. Length indicates a location along the given axis at which the break is to occur.
changedUpdate(DocumentEvent, Shape, ViewFactory)
    Notification from the document that attributes were changed in a location for which this view is responsible.
getBreakPenalty(axis, length)
    Determines the penalty for breaking the view. For example, the view may not support breaking, the view might insist on being broken, or it might return some value between the two bounds.
getDocument( )
    Fetch the model associated with the view.
getElement( )
    Fetch the structural portion of the subject to which this view is mapped. The view may not be responsible for the entire portion of the element.
getPreferredShape(Shape, ViewFactory)
    Determine the preferred region for this view. The candidate shape may be mutated and used as the return value. The factory is given in case the view recreates children if it performs a layout to satisfy the request.
getRange( )
    Fetch the portion of the model to which this view is responsible.
getResizePenalty(axis, length)
    Determines the penalty for changing the size of the view if it supports multiple sizes. A view can look at the penalty to determine whether to perform the break or resize.
insertUpdate(DocumentEvent, Shape, ViewFactory)
    Notification that something was inserted into the document in a location for which this view is responsible.
modelToView(Position, Shape, Factory)
    Provides a mapping from the document model coordinate space to the coordinate space of the view mapped to it.

paint(Graphics, Shape, ViewFactory)
  Render using the given rendering surface and area on that surface. The view may need to do layout and create child views to enable itself to render into the given allocation.
removeUpdate(Document, Shape, ViewFactory)
  Notification that something was removed from the document in a location for which this view is responsible.
viewToModel(Point, Shape, ViewFactory)
  Provides a mapping from the view coordinate system to the logical coordinate space of the model.

These methods are examples of methods that can be implemented for View Fragment. Other methods can be used to replace or supplement these methods.

Change Notification

Referring to FIG. 5A, Controller 512 can cause a change to occur in Model 506. If the change in Model 506 affects information that is being displayed in View 504, the change is to be propagated to View 504. In one or more embodiments of the invention, a Listener, or Observer, is used to facilitate change notification. In addition, a DocumentEvent object includes information about the change and methods that manipulate the change information (e.g., apply the change to View 504).

The Listener registers with Model 506 to receive change notifications. When a change occurs, Model 506 sends a notification to the Listener along with a DocumentEvent. The Listener forwards the notification including the DocumentEvent to View 504. A view fragment that receives the notification and DocumentEvent determines whether it or any of its children are affected by the change. If it is affected, it modifies its display according. If a child view fragment is affected, the parent view fragment forwards the notification and DocumentEvent to the child view fragment.

In an embodiment of the invention, the Listener and DocumentEvent are implemented as objects that include methods for processing a change notification. The following are methods of the Listener:

changedUpdate(DocumentEvent)
  Notification that a attribute or set of attributes were changed.
removeUpdate(DocumentEvent)
  Notification that a portion of the document has been removed. A range can be specified.
insertUpdate(DocumentEvent)
  Notification that there was an insert into the document. A range can specify the bounds of the inserted region of the document.

The DocumentEvent stores the document changes as the document is being modified. The DocumentEvent identifies the model that was changed, the area of the model's document that was modified and an edit history to support, for example, undo and redo operations. The following are methods of DocumentEvent:

addedChild(Parent Element, Child Element)
  Notification that the child element was added to the parent element.
childrenAdded(Element)
  Notification that children were added to the parent element
childrenRemoved (Parent Element)
  Notification that a parent element's children were removed.
elementsModified( )
  Identifies the elements that were affected by the change.
getDocument( )
  Identifies the document that was changed.
getHistory( )
  Retrieves an edit history.
getRange( )
  Retrieves the range of the document that was affected by the change.
isModified(Element)
  Indicates whether the given element was modified.
removedChild(Parent Element, Child Element)
  Notification that a child element was removed from the parent element.

These methods are examples of methods that can be implemented for Listener and DocumentEvent. Other methods can be used to replace or supplement these methods.

Object Interface

Figure 8:
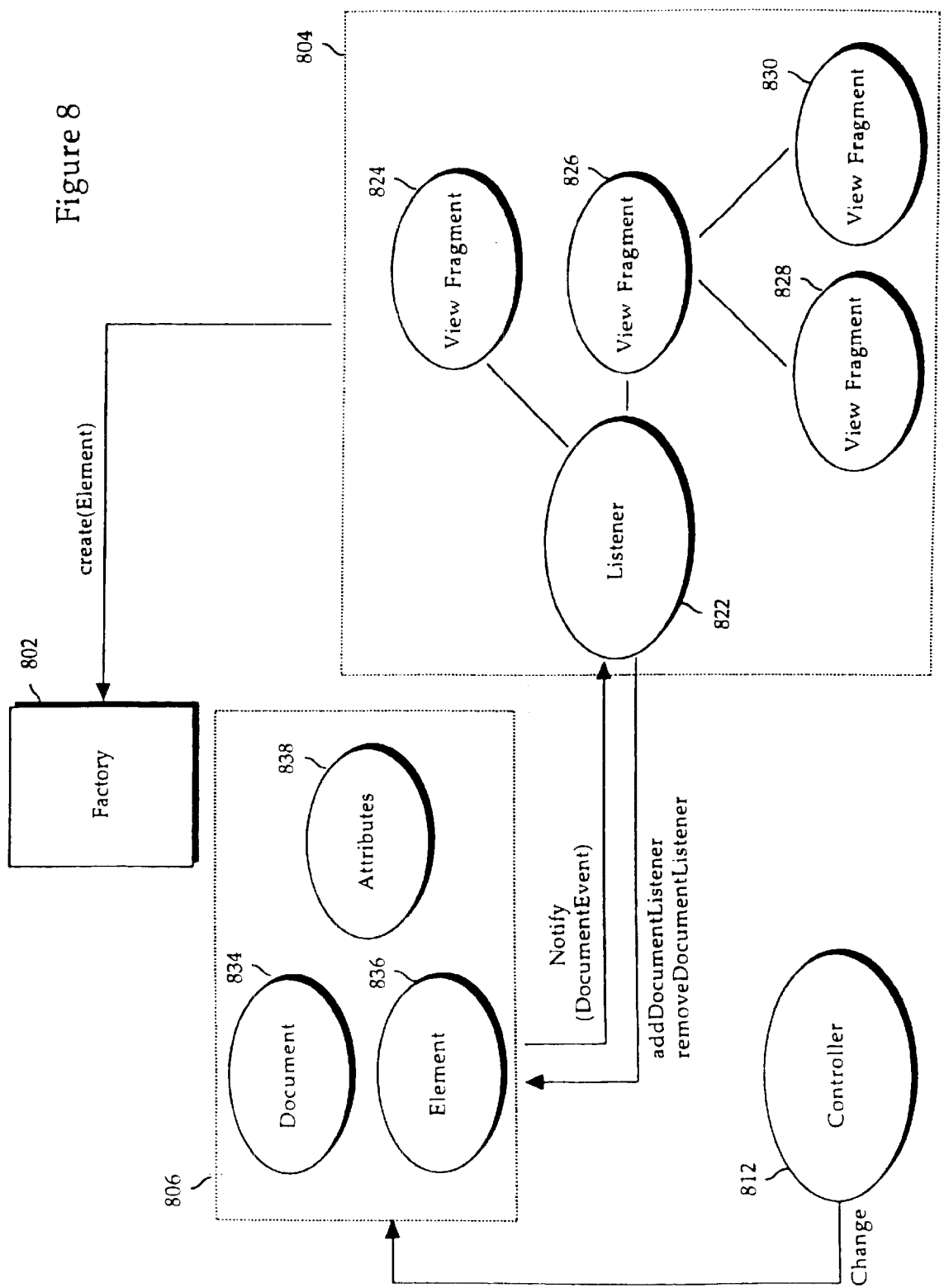
FIG. 8 illustrates interactions between object instances in an embodiment of the invention having Factory, Model and View object classes.

In an embodiment of the invention, Factory, Model, and View are implemented as object-oriented object classes that implement some or all of the methods described above. FIG. 8 illustrates interactions between object instances in an embodiment of the invention having Factory, Model and View object classes.

Model 806 comprises an instance of Document 834 and one or more instances of Element 836 and Attributes 838. Attributes 838 can be associated with Document 834 and contain attributes associated with Model 806, or Attributes 838 can contain attributes of and be associated with Element 836.

Controller 812 sends change requests to Model 806. For example, Controller 812 can invoke the setAttribute method of Attributes 838, or the insertString, remove, or setAttributes methods of Document 834.

A change in Model 806 causes Model 806 to notify View 804 of the change. In an embodiment of the invention, Listener 822 facilitates the notification of View 804. Initially, Listener 822 sends a registration request to Model 806 (e.g., invokes the addDocumentListener method of Document 834 to register as a listener with Model 806). When a change is made to Model 806, a notification is sent to Listener 822. For example, the changedUpdate, removedUpdate, or insertUpdate method is invoked on Listener 822 with a DocumentEvent. Listener 822 forwards the notification to the view fragments. For example, Listener 822 forwards the notification and DocumentEvent to View Fragments 824 and 826. A parent view fragment (e.g., View Fragment 826) determines whether any of its children view fragments are affected (e.g., View Fragments 828 and 830). If so, the parent view fragment sends the notification to the appropriate child view fragment(s).

View 804 can invoke a create method of Factory 802. For example, a root view fragment can invoke the create method of Factory 802 to build view fragments for its children. The children view fragments can determine whether they wish to delegate to one or more child view fragments. If so, the children view fragments can invoke the create method of Factory 802 to build its child view fragment(s).

When a software application is invoked, View 804 may be empty except for Listener 822. The change notification mechanism can be used to populate View 804. Model 806 sends a change notification to Listener 822 specifying the entire document as the range. A create request is sent by the Listener 822 to the factory to create the root view fragment (e.g., view fragment 824). The view fragment structure continues to be created as described above with each view fragment notifying Factory 802 to create a child view fragment it it determines that it wants a child view fragment.

Embodiment of Computer Execution Environment (Hardware)

Figure 9:
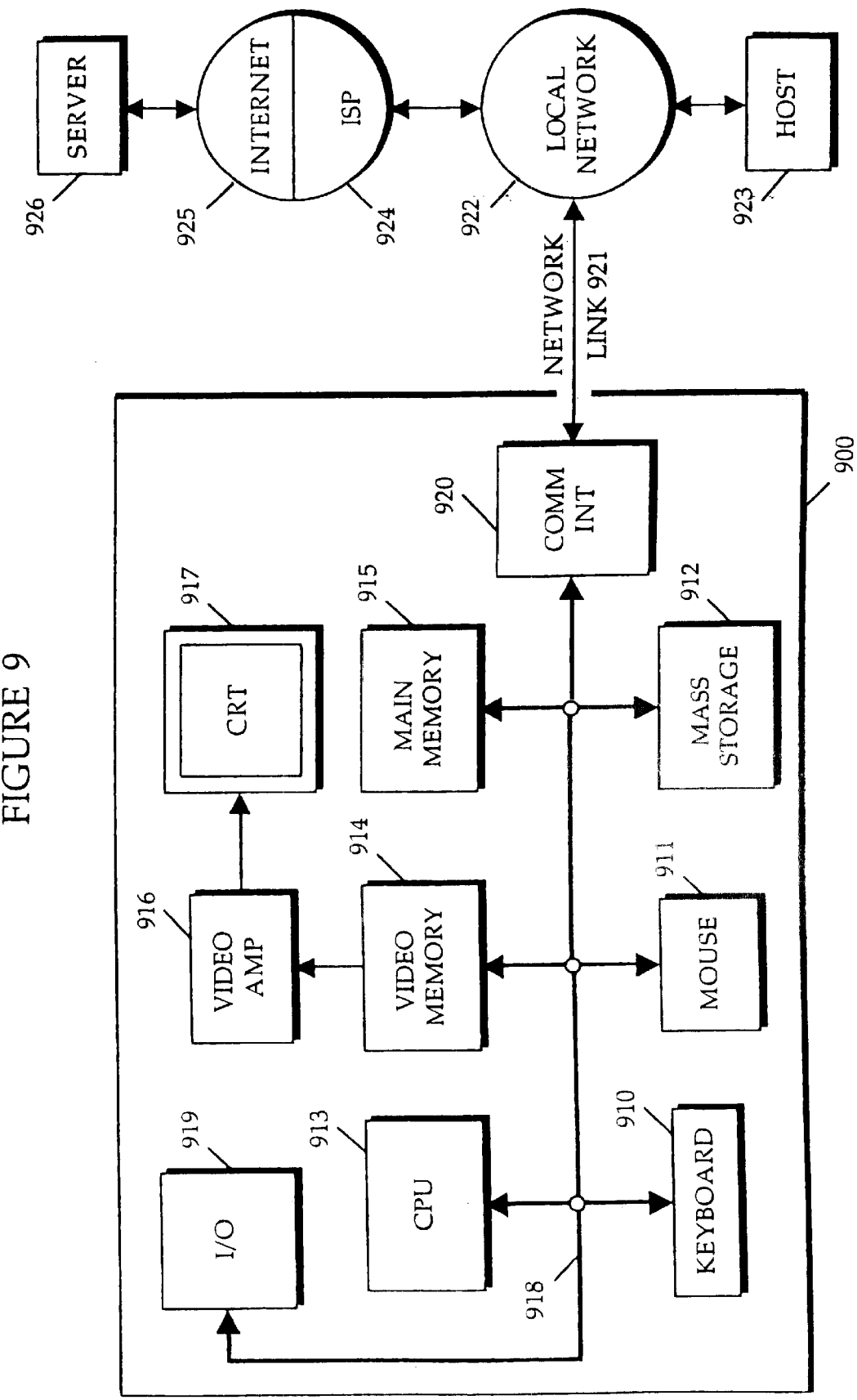
FIG. 9 is a block diagram of an embodiment of a computer system capable of providing a suitable execution environment for an embodiment of the invention.

An embodiment of the invention can be implemented as computer software in the form of computer readable program code executed on a general purpose computer such as computer 900 illustrated in FIG. 9. A keyboard 910 and mouse 911 are coupled to a bi-directional system bus 918. The keyboard and mouse are for introducing user input to the computer system and communicating that user input to central processing unit (CPU) 913. Other suitable input devices may be used in addition to, or in place of, the mouse 911 and keyboard 910. I/O (input/output) unit 919 coupled to bi-directional system bus 918 represents such I/O elements as a printer, A/V (audio/video) I/O, etc.

Computer 900 includes a video memory 914, main memory 915 and mass storage 912, all coupled to bi-directional system bus 918 along with keyboard 910, mouse 911 and CPU 913. The mass storage 912 may include both fixed and removable media, such as magnetic, optical or magnetic optical storage systems or any other available mass storage technology. Bus 918 may contain, for example, thirty-two address lines for addressing video memory 914 or main memory 915. The system bus 918 also includes, for example, a 32-bit data bus for transferring data between and among the components, such as CPU 913, main memory 915, video memory 914 and mass storage 912. Alternatively, multiplex data/address lines may be used instead of separate data and address lines.

In one embodiment of the invention, the CPU 913 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images.

Computer 900 may also include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to host computer 923 or to data equipment operated by an Internet Service Provider (ISP) 924. ISP 924 in turn provides data communication services through the world wide packet data communication network now commonly referred to as the "Internet" 925. Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Computer 900 can send messages and receive data, including program code, through the network(s), network link 921, and communication interface 920. In the Internet example, server 926 might transmit a requested code for an application program through Internet 925, ISP 924, local network 922 and communication interface 920. In accord with the invention, one such downloaded application is the generation of a Graphical User Interface described herein.

The received code may be executed by CPU 913 as it is received, and/or stored in mass storage 912, or other non-volatile storage for later execution. In this manner, computer 900 may obtain application code in the form of a carrier wave.

The computer system described above is for purposes of example only. An embodiment of the invention may be implemented in any type of computer system or programming or processing environment.

Thus, a method and apparatus for generating a graphical user interface has been provided in conjunction with one or more specific embodiments. The invention is defined by the claims and their full scope of equivalents.

What is claimed is:

1. A method of creating a graphical user interface (GUI) for an application for use on a computer system comprising:

obtaining a model, said model having data for an application and definitions of one or more structural components for generating a GUI for said application, wherein said GUI comprises said application's look and feel to a user;

initiating on said computer system a first program module that uses said definitions of said one or more structural components to implement a first portion of said GUI from components in a first GUI library, said GUI displaying said data for said application;

accepting, by a controller, change inputs to said definitions of said one or more structural components, said controller sending said change inputs to said model;

sending a change notification from said model to said GUI if said model acknowledges said change inputs; and initiating by said GUI on said computer system a second program module to implement a second portion of said GUI from a second GUI library upon receipt of said change notification by said model;

creating a factory with one or more additional program modules;

identifying a characteristic of one of said one or more structural components to use in selecting one of said one or more additional program modules.

2. The method of claim 1 wherein said initiating further comprises:

examining said characteristic to identify said one of said one or more additional program modules.

3. The method of claim 1 further comprising:

sending a creation request to said factory that identifies said one of said one or more structural components.

4. The method of claim 1 wherein said model is defined in an Hypertext Markup Language (HTML) document, said one of said one or more structural components is an HTML element and said characteristic is an attribute of said HTML element.

5. The method of claim 1 further comprising:

said application making a modification to said model;

said first program module determining whether a structural change should be made to said GUI as a result of said modification to said model.

6. The method of claim 5 wherein said structural change comprises initiating a third program module to implement a third portion of said GUI and wherein said third portion of said GUI uses a third member of said one or more structural components and wherein said first member, said second member, and said third member are different structural components which access different GUI libraries.

7. An article of manufacturing comprising:

a computer usable medium having computer readable program code embodied therein configured to create a graphical user interface (GUI) for an application for use on a computer system comprising:

computer readable program code configured to cause a computer to obtain a model having data for an application and definitions of one or more structural components for generating a GUI for said application, wherein said GUI comprises said application's look and feel to a user;

computer readable program code configured to cause a computer to initiate on said computer system a first program module that uses said definitions of said one or more structural components to implement a first portion of said GUI from components in a first GUI library, said GUI;

computer readable program code configured to cause a controller in said computer to accept change inputs to said definitions of said one or more structural components, said controller sending said change inputs to said model;

computer readable program code configured to cause a computer to send a change notification from said model to said GUI if said model acknowledges said change inputs; and computer readable program code configured to cause a computer to initiate by said GUI on said computer system a second program module to implement a second portion of said GUI from a second GUI library upon receipt of said change notification by said model;

computer readable program code configured to cause a computer to create a factory with one or more additional program modules;

computer readable program code configured to cause a computer to identify a characteristic one of said one or more structural components to use in selecting one of said one or more additional program modules.

8. The article of manufacturing of claim 7 wherein said computer readable program code configured to cause a computer to initiate said first program module further comprises:

computer readable program code configured to cause a computer to examine said characteristic to identify said one of said one or more additional program modules.

9. The article of manufacturing of claim 7 further comprising:

computer readable program code configured to cause a computer to send a creation request to said factory that identifies said one of said one or more structural components.

10. The article of manufacturing of claim 7 further comprising:

computer readable program code configured to cause a computer to make a modification to said one of said one or more structural components;

computer readable program code configured to cause said first program module to determine whether a structural change should be made to said GUI as a result of said modification to said one of said one or more structural components.

11. The article of manufacturing of claim 7 wherein said structural change comprises initiating a third program module to implement a third portion of said GUI and wherein said third portion of said GUI uses a third member of said one or more structural components and wherein said first member, said second member, and said third member are different structural components which access different libraries.

12. A computer data signal embodied in a carrier wave and representing sequences of instructions which, when executed by a processor, cause said processor to create a graphical user interface (GUI) for an application by performing by:

obtaining a model, said model having data for an application and definitions of one or more structural components for generating a GUI for said application, wherein said GCI comprises said application's look and feel to a user;

initiating on said computer system a first program module that uses said definitions of said one or more structural components to implement a first portion of said GUI from components in a first GUI library, said GUI displaying said data for said application;

accepting, by a controller, change inputs to said definitions of said one or more structural components, said controller sending said change inputs to said model;

sending a change notification from said model to said GUI if said model acknowledges said change inputs; and initiating by said GUI on said computer system a second program module to implement a second portion of said GUI from a second GUI library upon receipt of said change notification by said model;

obtaining a factory with one or more additional program modules;

identifying a characteristic of one of said one or more structural components to use in selecting one of said one or more additional program modules.

13. The computer data signal of claim 12 wherein said step of initiating further comprises the step of:

examining said characteristic to identify said one of said one or more additional program modules.

14. The computer data signal of claim 12, wherein said sequences of instructions, when executed by said processor, cause said processor to perform the further steps of;

sending a creation request to said factory that identifies said one of said one or more structural components.

15. The computer data signal of claim 12 wherein said model is defined in an Hypertext Markup Language (HTML) document, said one of said one or more structural components is an HTML element and said characteristic is an attribute of said HTML element.

16. The computer data signal of claim 12 wherein said sequences of instructions, when executed by said processor, cause said processor to perform the further steps of:

said application making a modification to said model;

said first program module determining whether a structural change should be made to said GUI as a result of said modification to said model.

17. The computer data signal of claim 12 wherein said structural change comprises initiating a third program module to implement a third portion of said GUI and wherein said third portion of said GUI uses a third member of said one or more structural components and wherein said first member, said second member, and said third member are different structural components which access different libraries.

* * * * *